United States Patent [19]

Rygg

[11] 4,359,392

[45] Nov. 16, 1982

[54] STABILIZATION OF MODIFIED CELLULOSE IN BRINES AT HIGH TEMPERATURES

[75] Inventor: Ralph H. Rygg, Keller, Tex.

[73] Assignee: Mobil Oil Corporation, New York, N.Y.

[21] Appl. No.: 220,880

[22] Filed: Dec. 29, 1980

[51] Int. Cl.$^3$ .............................................. E21B 43/00
[52] U.S. Cl. ............................... 252/8.55 R; 252/397; 536/88
[58] Field of Search ............ 252/8.5 A, 8.5 C, 8.55 R, 252/397; 536/88

[56] References Cited

U.S. PATENT DOCUMENTS

| | | | |
|---|---|---|---|
| 1,813,664 | 7/1931 | Christiansen et al. | 252/397 X |
| 3,243,000 | 3/1966 | Patton et al. | 175/65 |
| 3,290,249 | 12/1966 | Wilson | 252/397 X |
| 3,852,201 | 12/1974 | Jackson | 252/8.5 |
| 4,046,197 | 9/1977 | Gruesbeck et al. | 252/8.5 |
| 4,090,968 | 5/1978 | Jackson et al. | 252/8.5 |

FOREIGN PATENT DOCUMENTS 2055106  6/1980  United Kingdom ................ 252/8.5

OTHER PUBLICATIONS

Rogers, *Composition and Properties of Oil Well Drilling Fluids,* Third Edition, 1963, pp. 406–414, 416, 417.

*Primary Examiner*—Herbert B. Guynn
*Attorney, Agent, or Firm*—Charles A. Huggett; James F. Powers, Jr.; Lawrence O. Miller

[57] ABSTRACT

Novel processes are provided for the stabilization of modified celluloses in brine solutions useful for well completion and workover. Copper species are added to such fluids in an amount effective substantially to decrease the rate of decomposition of such cellulose at temperatures above about 225° F.

11 Claims, No Drawings

STABILIZATION OF MODIFIED CELLULOSE IN BRINES AT HIGH TEMPERATURES

BACKGROUND OF THE INVENTION

This invention relates to the stabilization of modified celluloses in aqueous salt solutions or brines; such stabilization is effective at moderate and high temperatures. This invention is also directed to brine fluids containing modified cellulose, especially hydroxyethyl cellulose as viscosifying agents wherein stabilization of the modified cellulose to high temperature has been accomplished. This invention also deals with certain techniques employed in oil and gas production notably well completion and "workover", which employ such stabilized, viscosified brines.

An important step in the production of oil and gas from wells is the "completion" of a drilled well. Such completion may comprise numerous subtasks including perforation, cementing, acidizing, fracturing, and others. Those skilled in the art will recognize that one important task is the removal of well debris through the use of a completion fluid. The irrigation of a drilled well with a completion fluid has a salutary effect of washing or floating out various forms of drilling or other debris which could otherwise clog the petroleum producing strata and impede delivery of oil or gas to the production site for recovery. A similar type of fluid is employed during workover of an established well. Workover is a term generic to a process for revitalizing a well to improve its productive performance. Fluid removal of debris following such a workover is usually required; fluids for this purpose share many requirements with completion fluids. Such fluids will be denominated generically hereinafter as "clear brines".

Those skilled in the art will appreciate that numerous requirements may be imposed upon completion and workover fluids (clear brines) depending upon the exigencies of oil field operations. The requirements which are of chief relevance to the present invention are the requirements of specific gravity or density and of viscosity. It will be understood that conditions "downhole" of a petroleum well are nearly always substantially different from standard temperature and pressure. In general, such locations are under elevated hydrostatic pressure from surrounding strata and experience elevated temperatures. Temperatures in excess of 225°–250° F. are common and much higher temperatures are not uncommon. As wells are sunk to greater and greater depths, higher temperatures and pressures will be experienced.

It has long been appreciated that clear brines for completion and workover must, in general, have specific gravities or densities higher than that of water. Thus, such fluids commonly comprise aqueous solutions of inorganic salts resulting in densities higher than water's 8.3 pounds per gallon. For example, saturated solutions of potassium chloride, sodium chloride, and calcium chloride have densities of 9.7, 10.0, and 11.6 pounds per gallon respectively; such brines are frequently employed in completion and workover operations. Such elevated densities are needed in order to maintain a hydrodynamic equilibrium between the downhole pressure and the clear brine completion or workover fluid. Without aid of this high density, the equipment employed for fluid circulation would be liable to failure. Such increased density also aids in the suspension of debris particles for transport out of the well.

The second requirement for clear brines which is of importance in the context of the present invention is that of viscosity. It is known that such brines should possess viscosities which facilitate the suspension and transport of debris particles. Accordingly, viscosifiers are generally added to such brines. Such viscosifiers have included guar, xanthan, and other gums, modified celluloses, especially hydroxyethyl cellulose (HEC), and biologically modified saccharides such as "XC" polymer and others. The preferred materials for such viscosifiers are the modified celluloses, especially HEC.

A major problem with the employment of HEC and brines used at high temperatures has been a relatively rapid breakdown of viscosity of the solutions thus used. This breakdown, which is believed to be caused by depolymerization of the cellulosic structure or by other modifications thereof, has diminished the effectiveness of completion and workover applications employing such viscosified brines. The breakdown in viscosity is most dramatically effected by changes in downhole temperature, becoming serious above about 225° F. and critical above about 250° F.

While the maintenance of viscosity in such clear brines is desirable during completion or workover operations, following termination of such procedures, it is frequently desirable to "break" the viscosity intentionally. It is known that acidification of HEC-modified brines will cause hydrolysis of the HEC and the diminution in the viscosity thereof. It is desired to maintain the ability to break the HEC-modified brines with acid or otherwise when desired while avoiding degradation in viscosity during use for completion or workover.

Accordingly, it is an object of this invention to provide a method for the stabilization of modified cellulose in clear brines. Another object is to provide clear brines viscosified with modified cellulose having viscosity which breaks down at a decreased rate at temperatures above about 225° F. Still another object of this invention is to facilitate improved efficiency in completion and workover operations at elevated temperatures. Another object is to provide clear brines which may be caused to lose a substantial portion of viscosity upon acidification or other selected treatment. These and other objects are obtained to the use of the novel processes and compositions of this invention.

DESCRIPTION OF THE PRIOR ART

U.S. Pat. No. 3,243,000 issued to Patton, describes the stabilization of certain cross-linked polysacharides in well drilling fluids with chromium species.

SUMMARY OF THE INVENTION

It has been found that the breakdown in viscosity of modified cellulose solutions in clear brines, especially at moderate and high temperatures, can be diminished by incorporating in such solutions an effective amount of a copper species. Thus, this invention concerns processes for improving the temperature stability of brine solutions of modified cellulose comprising adding to said solution a member selected from the group consisting of copper metal, copper salts, and organocuprates in an amount sufficient to decrease substantially the rate of decomposition of said modified cellulose in said brine solution at temperatures above about 225° F. as measured by the change in viscosity thereof. This invention also provides processes for well completion or workover employing modified cellulose-viscosified species. This invention is further directed to a method for the production of well completion or workover fluids comprising salts and modified cellulose by employing water having a known copper content and adding copper thereto to provide an amount of copper sufficient to decrease substantially the rate of decomposition of said modified cellulose in said brine at temperatures in excess of about 225° F. This invention is also directed to clear brines useful for completion and workover of petroleum walls including salts, modified celluloses, and an amount of a copper species sufficient to stabilize the modified cellulose against decomposition at temperatures in excess of about 225° F. as measured by the viscosity thereof.

DETAILED DESCRIPTION OF THE INVENTION

The stabilization of modified celluloses such as hydroxyethyl cellulose in brine at moderate and high temperatures according to this invention may be practiced upon brines comprising numerous salts. Thus, modified cellulose-viscosified brines comprising the halogen and other salts of lithium, sodium, potassium, rubidium, cesium, magnesium, calcium, strontium, barium, and numerous other elements may benefit from the inclusion of copper species. While brines of numerous such salts may be treated, it has been found that brines containing substantial concentrations of chloride ion are most drammatically stabilized by copper. Thus, it has been found that those brines comprising at least a 50 mole percent ratio of chloride ion to other negative salt ions such as bromide, iodide, etc., are most benefited by the practice of the present invention. Accordingly, while this invention is applicable to brines including substantial amounts of, for example, calcium bromide and zinc bromide, it is preferred to employ brines wherein nonchloride species are present in molar amounts of less than about 50 percent.

The modified cellulose viscosifiers useful in the practice of this invention comprise those celluloses which have been modified either chemically or biologically to provide aqueous solution viscosification agents. While numerous such modified celluloses are known to those skilled in the art, hydroxyethyl cellulose (HEC) is preferred due to considerations of cost, availability, and effectiveness. The modified celluloses may be added to the brine solutions in any desired amount consistent with the solubility of the cellulose.

The rate of decomposition of modified cellulose according to this invention may be measured by the change in viscosity of the solutions thereof with time. A substantial decrease in said rate would be effected by a lessening thereof so as to provide at least a 10% time increase in the maintenance of viscosity needed for oil field operations.

The copper species which may be added to the modified cellulose-viscosified brines to decrease the rate of decomposition of such cellulose at temperatures above about 225° F. may be any of a wide variety of such species. Thus, finely divided copper metal may be added as may numerous copper salts and organic cuprates. It is preferred to add finely divided copper metal or copper salts such as cuprous chloride, cupric chloride, copper sulfide, cuprous bromide, cupric bromide, etc. It is preferred to employ copper in the 0 or +1 oxidation state if possible, such as copper metal, cuprous chloride or cuprous sulfide.

It is difficult to specify the amount of copper necessary for addition to any given brine for any given oil field situation. In general, however, it is believed that those skilled in the art will have no difficulty in determining what amount of copper is effective in reducing substantially the rate of decomposition of modified celluloses in brine according to this invention. It has been found experimentally that the presence of copper in quite small amounts lends stability to modified-cellulose brines. Amounts of copper as low as from about 50 ppm to about 300 ppm have been found to be adequate. This level of copper, while quite low, is considerably in excess of that found in most nascent ground waters. Of course, it is certainly possible to rely upon native copper concentrations of available water to supply a portion of the copper necessary for the stabilization processes of this invention. In such a case, it is necessary to add additional amounts of copper to the water thus employed to provide a sufficiency thereof.

In general, for convenience, amounts of copper species may be added which are in excess of the minimum thus required. Frequently, it is desired to employ suspensions of finely particulated copper metal, copper sulfide, or other copper compound in powder form. Such a practice provides a depot of copper in the completion or workover fluids formulated thereby. The effects of dilution by unanticipated water sources may be overcome by this practice. It is also a preferred embodiment to add quantities of comparatively soluble copper salts such as cuprous chloride, etc. to such brines.

The mechanism of action of copper species in stabilizing the brine solutions of modified cellulose against decomposition at elevated temperatures according to this invention is not known. It has been found, however, that such stabilization is most pronounced in brines having high molar concentrations of chloride ion, preferably above about 50%. It is theorized that the mechanism of action of the copper stabilization is related in some way to an interaction among the copper, the modified cellulose, and the chloride containing species or chloride ion. Alternatively, it is possible that a copper-chloride ion complex is obtained, thus to maintain the copper in whatever oxidation state is required for the stabilization of the modified celluloses. Other mechanisms may also be proposed to explain the action of copper species in stabilizing such systems. Any such mechanism should take into account the significant interaction between the copper species and available chloride ion in the brines; such interaction is believed to be synergistic. Accordingly, it is preferred to employ brines having greater than about 50 mole percent of chloride species therein.

The practice of this invention is quite simple. According to one embodiment, a clear brine may be formulated from salts, water, modified cellulose, and an effective amount of copper metal or copper salt. For convenience, from about 0.001 to about 0.1 weight percent of finely divided copper metal, copper sulfide, powdered cuprous chloride, or other suitable copper-containing species are added to the brine. Such amounts have been found in experimental practice to provide a sufficiency of copper for the stabilization of the modified cellulose and is believed generally to provide an excess thereof.

Another embodiment useful in the practice of this invention provides water containing a known amount of copper dissolved therein. Thus, a selected inorganic salt is dissolved in such water to provide the desired density, a quantity of modified cellulose preferably HEC is added to increase the viscosity of the solution and the copper content of the fluid is adjusted to provide an amount of copper sufficient to decrease substantially the rate of decomposition of the modified cellulose brines at temperatures above about 225° F.

The following examples have been selected to demonstrate the stabilizing effect of copper species upon modified cellulose in brine solutions at elevated temperatures. These examples are illustrative only and should not be construed as limiting. The examples were performed on a laboratory scale as hereinafter described. Solutions of modified cellulose (here, various commercial formulations of hydroxyethyl cellulose or HEC) were formulated in various brines at various concentrations (given in the traditional measurement system of pounds per barrel; one lb/bbl equals approximately one gram per 350 ml). The viscosified brine was mixed at 3,000 rpm in a standard, sealable stainless steel vessel for 20 minutes at which time viscosity measurements were begun. Occasionally, full viscosity had not developed by the beginning of the measurement period; such will be apparent from an increase in viscosity after the initial heating period.

The steel vessel was sealed and placed at a selected temperature into an oven having rolling means for continuous agitation of the samples. Measurements were periodically made. When measurements were to be performed upon the samples, they were removed from the oven, cooled in water to room temperature (78° F.) and mixed for 3 minutes in a standardized fashion. Measurements were performed on a FANN 35VG commercial viscosimeter according to the directions supplied therewith. Determination were made of plastic viscosity (PV-measured in centipoises), yield point (YP-measured in pounds per 100 square feet) and initial gel strength (IGS-measured in pounds per 100 square feet). All of these indices are important in evaluating the performance of viscosifiers for completion and workover use as will be appreciated by those skilled in the art. Values for these perimeters were determined periodically as indicated, normally in multiples of 16 hours.

EXAMPLE I

Viscosity data of hydroxyethyl cellulose from various sources were determined in calcium chloride solutions at 275° F. over time. Thus, $CaCl_2$ solutions having concentrations equivalent to 3 lb/bbl of QP 100 and QP 4400 (Union Carbide, the two materials are believed to have different molecular weights), and J164 (Dowell, believed to be similar to QP100), such solutions having various copper species added thereto, were treated over time at 275° F. as above described. The results are presented in Table I.

TABLE I

| RUN | BRINE | COPPER | | 0 HRS. | 16 | TIME 32 | 48 | 64 | 80 | (96) | (236) |
|---|---|---|---|---|---|---|---|---|---|---|---|
| 1 | Saturated $CaCl_2$ with QP 100 | NONE | PV | 70 | 22 | — | | | | | |
| | | | YP | 160 | 2 | — | | | | | |
| | | | IGS | 54 | 0.5 | — | | | | | |
| 2 | Saturated $CaCl_2$ with QP 100 | Excess Copper Metal | PV | 70 | 153 | 75 | 73 | — | | | |
| | | | YP | 160 | 101 | 122 | 74 | — | | | |
| | | | IGS | 54 | 20.5 | 7.5 | 3 | — | | | |
| 3 | Saturated $CaCl_2$ with QP 100 | Excess Copper Sulfide Powder | PV | 70 | 72 | 76 | 70 | — | | | |
| | | | YP | 160 | 154 | 107 | 51 | — | | | |
| | | | IGS | 54 | 14.5 | 5.5 | 2 | — | | | |
| 4 | Saturated $CaCl_2$ with J-164 | NONE | PV | 141 | 25 | — | | | | | |
| | | | YP | 151 | 3.5 | — | | | | | |
| | | | IGS | 60 | 1 | — | | | | | |
| 5 | Saturated $CaCl_2$ with J-164 | Excess Copper Metal | PV | 141 | 144 | 150 | — | — | — | — | 46 |
| | | | YP | 151 | 105 | 101 | — | — | — | — | 9 |
| | | | IGS | 60 | 23 | 20 | — | — | — | — | 1 |
| 6 | Saturated $CaCl_2$ with J-164 | 200 ppm $CuCl_2$ | PV | 141 | 67 | 75 | — | — | — | 58 | — |
| | | | YP | 151 | 138 | 149 | — | — | — | 26 | — |
| | | | IGS | 60 | 16 | 13 | — | — | — | 2 | — |
| 7 | Same as Run 4 | 50 ppm $CuCl_2$ | PV | 141 | — | — | — | 73 | 68 | 59 | |
| | | | YP | 151 | — | — | — | 101 | 53 | 25 | |
| | | | IGS | 60 | — | — | — | 6.5 | 3 | 2 | |
| 8 | Saturated $CaCl_2$ with QP 4400 | NONE | PV | 76 | 20 | — | | | | | |
| | | | YP | 118 | 4 | | | | | | |
| | | | IGS | 19 | 1 | | | | | | |
| 9 | Saturated $CaCl_2$ with QP 4400 | Excess Copper Metal | PV | 76 | 74 | — | — | — | 62 | 60 | |
| | | | YP | 118 | 93 | — | — | — | 31 | 28 | |
| | | | IGS | 19 | 6 | — | — | — | 2 | 2.5 | |
| 10 | Saturated $CaCl_2$ with QP 4400 | 100 ppm $CuCl_2$ | PV | 76 | 75 | — | — | — | 54 | | |
| | | | YP | 118 | 102 | — | — | — | 20 | | |
| | | | IGS | 19 | 7 | — | — | — | 2 | | |
| 11 | Same as Run 8 (second sample set) | Same as 8 | PV | 77 | 38 | 19 | — | | | | |
| | | | YP | 110 | 4 | 0 | — | | | | |
| | | | IGS | 18 | 1 | 1 | — | | | | |
| 12 | Same as Run 8 (second sample set) | 25 ppm CuCl | PV | 77 | 71 | 67 | 54 | — | | | |
| | | | YP | 110 | 67 | 41 | 15 | — | | | |
| | | | IGS | 18 | 3 | 3 | 2 | — | | | |
| 13 | Same as Run 8 (second sample set) | 50 ppm CuCl | PV | 77 | 71 | 68 | 61 | 48 | — | | |
| | | | YP | 110 | 63 | 48 | 25 | 10.5 | — | | |
| | | | IGS | 18 | 3.5 | 2.5 | 2 | 2 | — | | |
| 14 | Same as Run 8 (second sample set) | 100 ppm CuCl | PV | 77 | 71 | 67 | — | | | | |
| | | | YP | 110 | 69 | 40 | — | | | | |
| | | | IGS | 18 | 3.5 | 2.5 | — | | | | |
| 15 | Same as Run 8 (third sample set) | NONE | PV | 74 | — | — | — | 7 | | | |
| | | | YP | 124 | — | — | — | 1 | | | |
| | | | IGS | 21 | — | — | — | 0.5 | | | |

TABLE I-continued

| RUN | BRINE | COPPER | | 0 HRS. | 16 | 32 | 48 | 64 | 80 | (96) | (236) |
|---|---|---|---|---|---|---|---|---|---|---|---|
| 16 | Same as Run 8 (third sample set) | Excess Copper Metal | PV YP IGS | 74 124 21 | — — — | — — — | — — — | 55 27 2 | 50 17 2 | 40 8 2 | — — — |
| 17 | Same as Run 8 (third sample set) | Excess Cuprous Sulfide | PV YP IGS | 74 124 21 | — — — | — — — | — — — | 57 29 2.5 | 44 12 2 | 32 3 1 | — — — |
| 18 | Same as Run 8 (third sample set) | Excess Cupric Carbonate | PV YP IGS | 74 124 21 | — — — | — — — | — — — | 35 4.5 1.5 | — — — | — — — | — — — |
| 19 | Same as Run 8 (third sample set) | Excess Cuprous Iodide | PV YP IGS | 74 124 21 | — — — | — — — | — — — | 26 2.5 1.5 | — — — | | |

EXAMPLE II

The procedure of Example I was followed except that the samples were aged at 295° F. The data of Table II were collected.

TABLE II

| RUN | BRINE | COPPER | | 0 HRS. | 16 | 32 | 48 | 64 | 80 |
|---|---|---|---|---|---|---|---|---|---|
| 20 | Saturated Calcium Chloride with QP 4400 | NONE | PV YP IGS | 82 128 22 | 9 1 1 | — — — | | | |
| 21 | Saturated Calcium Chloride with QP 4400 | Excess Copper Metal | PV YP IGS | 82 128 22 | 49 8 1.5 | — — — | | | |
| 22 | Saturated Calcium Chloride with QP 4400 | 50 ppm CuCl | PV YP IGS | 82 128 22 | 28 1.5 1.5 | — — — | | | |
| 23 | Saturated Calcium Chloride with QP 4400 | 100 ppm CuCl$_2$ | PV YP IGS | 82 128 22 | 34 3 1.5 | — — — | | | |

EXAMPLE III

The procedure of Example I was followed with mixed brines as indicated; aging took place at 275° F. The following data were collected. (Table III).

TABLE III

| RUN | BRINE | COPPER | | 0 HRS. | 16 | 32 | 48 | 64 | 80 | 96 | 128 |
|---|---|---|---|---|---|---|---|---|---|---|---|
| 24 | Calcium Bromide-Calcium Chloride Solution - density 12.5 lb/gal; chloride concentration 8.8 molar with J-164 | NONE | PV YP IGS | 22 6 1.5 | 39 4 2 | — — — | | | | | |
| 25 | Calcium Bromide-Calcium Chloride Solution - density 12.5 lb/gal; chloride concentration 8.8 molar with J-164 | Excess Copper Metal | PV YP IGS | 22 6 1.5 | 89 85 4 | 81 60 3 | 74 41 2.5 | 67 24.5 2.5 | — — — | 62 20.5 2.5 | 51 7 — |
| 26 | Calcium Bromide-Calcium Chloride Solution - density 12.5 lb/gal; chloride concentration 8.8 molar with J-164 | 25 ppm CuCl | PV YP IGS | 22 6 1.5 | 80 65 3 | 69 30 2.5 | 54 9 1.5 | — — — | | | |
| 27 | Calcium Bromide-Calcium Chloride Solution - density 12.5 lb/gal; chloride concentration 8.8 molar with J-164 | 50 ppm CuCl | PV YP IGS | 22 6 1.5 | 92 105 6.5 | 71 28 2.5 | 50 7 2 | — — — | | | |
| 28 | Calcium Bromide-Calcium Chloride Solution - density 12.5 lb/gal; chloride concentration 8.8 molar with J-164 | 50 ppm CuCl$_2$ | PV YP IGS | 22 6 1.5 | 78 72 3 | 70 22 2.5 | 50 6 2.5 | — — — | | | |
| 29 | Calcium Bromide-Calcium Chloride Solution - density 12.5 lb/gal; chloride concentration 8.8 molar with J-164 | 100 ppm CuCl$_2$ | PV YP IGS | 22 6 1.5 | 77.5 39 2.5 | 43 19.5 2.5 | — — — | | | | |
| 30 | Calcium Bromide-Calcium Chloride Solution - density 15.1 lb/gal chloride concentration 5.4 molar, with J-164 | NONE | PV YP IGS | 26 0.5 1 | 85 25 2.5 | 51 3 2 | — — — | | | | |

TABLE III-continued

| RUN | BRINE | COPPER | | 0 HRS. | 16 | 32 | TIME 48 | 64 | 80 | 96 | 128 |
|---|---|---|---|---|---|---|---|---|---|---|---|
| 31 | Calcium Bromide-Calcium Chloride Solution - density 15.1 lb/gal chloride concentration 5.4 molar, with J-164 | Excess Copper Metal | PV YP IGS | 26 0.5 1 | 107 46 3 | 73 8 2 | — — — | | | | |

EXAMPLE IV

The procedure of Example I was performed on mixed brines as indicated at 225° F. At this lower temperature, too, brines having lower chloride molarity are not stabilized by copper species as well as are those having higher chloride concentrations. The data collected are as follows in Table IV.

TABLE IV

| RUN | BRINE | COPPER | | 0 HRS. | 16 | 32 | 48 | 64 | TIME 80 | 96 | 140 |
|---|---|---|---|---|---|---|---|---|---|---|---|
| 32 | Calcium Bromide-Calcium Chloride - density 13.0 lb/gal, chloride concentration 7.2 molar with 2 lb/barrel J-164 | NONE | PV YP IGS | 68 136 38 | 71 133 27 | — — — | — — — | — — — | 70 103 9 | 74 105 8 | 69 77 4.5 |
| 33 | Calcium Bromide-Calcium Chloride - density 13.0 lb/gal, chloride concentration 7.2 molar with 2 lb/barrel J-164 | Excess Copper Sulfide | PV YP IGS | 69 132 38 | 71 132 27 | — — — | — — — | — — — | 71.5 122 17 | 73 120 15.5 | 69 106 10 |

I claim:

1. A method for improving the temperature stability of a calcium chloride containing brine solution of hydroxyethyl cellulose comprising adding to said solution a member selected from the group consisting of copper metal, cuprous chloride, cupric chloride, cuprous bromide, cupric bromide, and cuprous sulfide, in an amount sufficient to decrease substantially the rate of decomposition of said hydroxyethyl cellulose in said brine solution at temperature above about 225° F.

2. The method of claim 1 wherein said brine includes a member selected from the group consisting of the halogen salts of lithium, sodium, potassium, rubidium, cesium, magnesium, calcium, strontium, barium and mixtures thereof.

3. The method of claim 2 wherein said halogen salts comprise a major molar proportion of chloride salts.

4. The method of claims 1, 2 or 3 wherein said solution is as a well completion fluid.

5. The method of claims 1, 2 or 3, wherein said solution is a workover fluid.

6. In a well completion or workover process employing a calcium chloride containing brine solution of hydroxyethyl cellulose, the improvement comprising adding to said solution a member selected from the group consisting of copper metal, cuprous chloride, cupric chloride, cuprous bromide, cupric bromide, and cuprous sulfide, in an amount sufficient substantially to decrease the rate of decomposition of said hydroxyethyl cellulose in said brine solutions at temperatures above about 225° F.

7. The improvement of claim 6 wherein said brine includes a member selected from the group consisting of the halogen salts of lithium, sodium, potassium, rubidium, cesium, magnesium, calcium, strontium, barium, and mixtures thereof.

8. The improvement of claim 7 wherein said halogen salts comprise a major molar proportion of chloride salts.

9. The improvement of claim 6 wherein said rate is decreased substantially at temperatures in excess of 250° F.

10. A method for producing a well completion or workover fluid comprising:
providing water having a known amount of a member selected from the group consisting of copper metal, cuprous chloride, cupric chloride, cuprous bromide, cupric bromide, and cuprous sulfide,
dissolving in said water calcium chloride,
dissolving in said water hydroxyethyl cellulose capable of increasing the viscosity of said fluid
and,
increasing the amount of said member selected from the group consisting of copper metal, cuprous chloride, cupric chloride, cuprous bromide, cupric bromide, and cuprous sulfide, of said water to provide therein an amount of said member sufficient to decrease substantially the rate of decomposition of said hydroxyethyl cellulose in said fluid at temperatures above about 225° F.

11. A wall completion or workover fluid comprising: an aqueous solution, calcium chloride, a hydroxyethyl cellulose capable of increasing the viscosity of said fluid, and an amount sufficient to decrease substantially the rate of decomposition of said hydroxyethyl cellulose at temperatures above about 225° F. of a member selected from the group consisting of copper metal, cuprous chloride, cupric chloride, cuprous bromide, and cuprous sulfide.

* * * * *